(12) United States Patent
Yokoi

(10) Patent No.: US 7,420,901 B2
(45) Date of Patent: Sep. 2, 2008

(54) INFORMATION RECORDING METHOD, RECORDING OPTICAL DISC, AND INFORMATION RECORDING/RECORDING/REPRODUCING APPARATUS

(75) Inventor: Kenya Yokoi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 436 days.

(21) Appl. No.: 10/538,072

(22) PCT Filed: Dec. 8, 2003

(86) PCT No.: PCT/JP03/15680

§ 371 (c)(1),
(2), (4) Date: Jul. 27, 2005

(87) PCT Pub. No.: WO2004/053857

PCT Pub. Date: Jun. 24, 2004

(65) Prior Publication Data

US 2006/0013090 A1 Jan. 19, 2006

(30) Foreign Application Priority Data

Dec. 9, 2002 (JP) .............................. 2002-356765

(51) Int. Cl.
*G11B 7/00* (2006.01)

(52) U.S. Cl. .................................................... 369/47.53

(58) Field of Classification Search .................. None
See application file for complete search history.

(56) References Cited

U.S. PATENT DOCUMENTS

| 5,602,814 | A | * | 2/1997 | Jaquette et al. | .......... | 369/47.53 |
| 7,206,351 | B2 | * | 4/2007 | Okumura et al. | ............ | 375/262 |
| 7,242,652 | B2 | * | 7/2007 | Chen et al. | ............... | 369/47.51 |

FOREIGN PATENT DOCUMENTS

| JP | 2000--268398 | 9/2000 |
| JP | 2003-248955 | 9/2003 |

* cited by examiner

*Primary Examiner*—Joseph Feild
*Assistant Examiner*—Peter Vincent Agustin
(74) *Attorney, Agent, or Firm*—Dickstein Shapiro LLP

(57) ABSTRACT

The present invention discloses an optical information recording method of an optical information recording and reproduction device that uses a semiconductor laser to record or reproduce data in an optical disk. Based on a detected value of an optical path difference of the optical disk, a calculated value of optimum recording power for recording data or an object value of recording power when data are being recorded is corrected. In addition, when calculating the optimum recording power before recording data in the optical disk, an optimum index ($\beta$) indicating the optimum recording power is corrected with respect to a predetermined first index, and the corrected optimum index is used as the calculated value of the optimum recording power Pwo. The predetermined first index is obtained by reproducing a trial write region which is recorded with recording power being varied stepwise.

12 Claims, 7 Drawing Sheets

FIG.2A
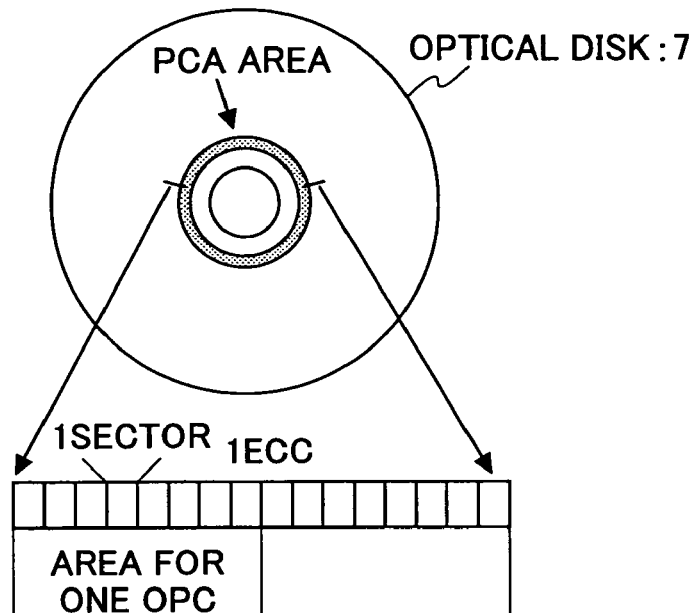
OPTICAL DISK : 7
PCA AREA
FIG.2B
1 SECTOR  1ECC
AREA FOR ONE OPC
FIG.2C
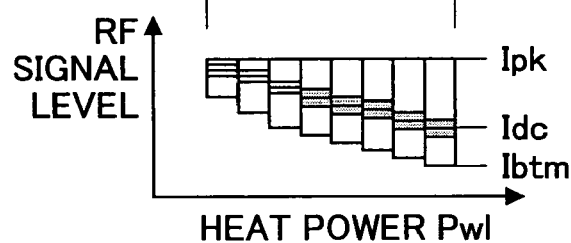
RF SIGNAL LEVEL
Ipk
Idc
Ibtm
HEAT POWER Pwl
FIG.2D
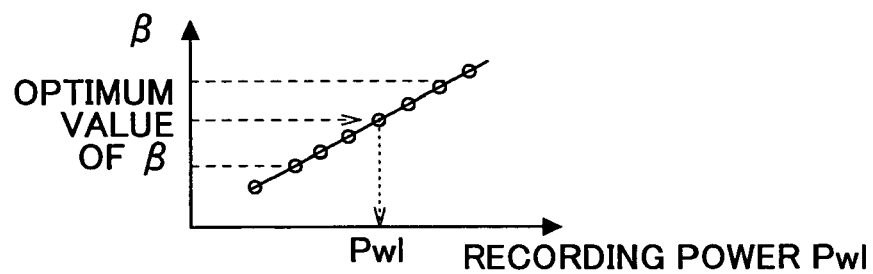
$\beta$
OPTIMUM VALUE OF $\beta$
Pwl    RECORDING POWER Pwl
FIG.2E
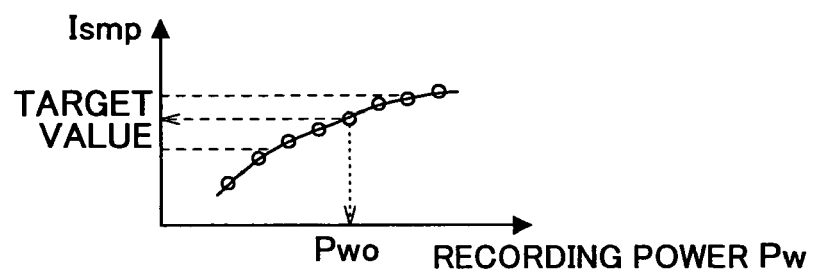
Ismp
TARGET VALUE
Pwo    RECORDING POWER Pw

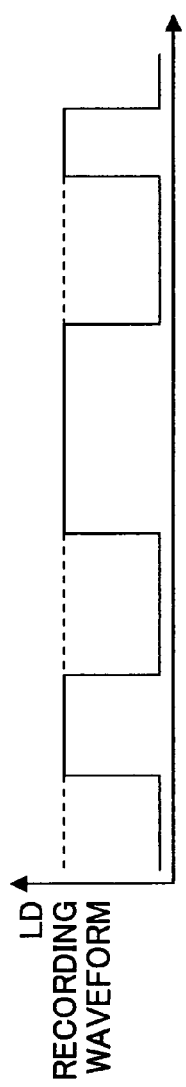
FIG.8A
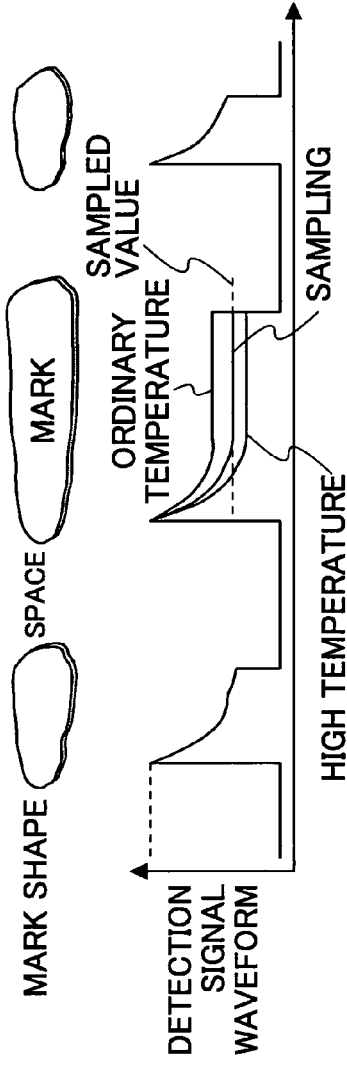
FIG.8B
FIG.8C
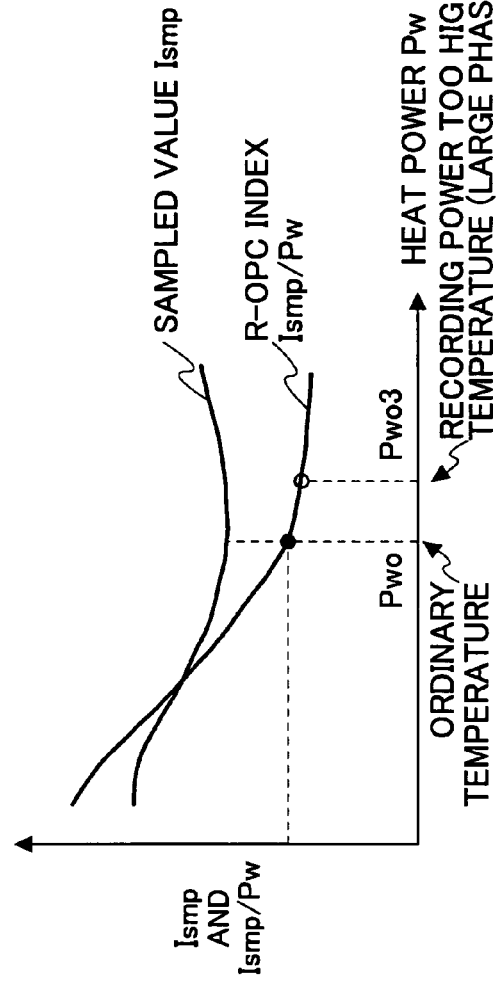
FIG.8D

| RECORDING CONDITION INFORMATION |
| --- |
| DISK STRUCTURE (RW/R) |
| DISK MANUFACTURER ID |
| RECORDING SPEED |
| OPTIMUM RECORDING POWER |
| OPTIMUM VALUE OF $\beta$ |
| RECORDING PULSE WIDTH |
| DISK OPTICAL PHASE DIFFERENCE INFORMATION |
| ... |
| ... |

INFORMATION RECORDING METHOD, RECORDING OPTICAL DISC, AND INFORMATION RECORDING/RECORDING/REPRODUCING APPARATUS

TECHNICAL FIELD

The present invention relates to an optical information recording method of an optical information recording and reproduction device, a Direct-Read-After-Write type optical disk with data recorded therein by using said optical information recording method, such as a CD (Compact Disk) (CD-ROM, CD-R, and CD-RW), or DVD (Digital Versatile Disk) (DVD-ROM, DVD-R, DVD-RW, and DVD-RAM), and an optical information recording and reproduction device (optical disk drive) using said optical information recording method and the Direct-Read-After-Write type optical disk.

BACKGROUND ART

In the related art, as an optical recording medium of an optical information recording and reproduction device, an optical disk such a CD for audio use or a DVD for video use are commercially available. In recent and continuing years, development is made on high quality DVDs having even higher capacity, for example, a DVD using a laser beam of a short wavelength, like a blue laser (blue laser DVD). These optical disks are used not only as read-only media, but also as external storage devices of video recorders, personal computers, etc., and are practically applied in optical information recording and reproduction devices capable of writing and reading data in the optical disks.

FIG. 9 is a diagram illustrating an example of a configuration of a portion of an optical pickup of an optical information recording and reproduction device (optical disk drive) for writing and reading data in the optical disk.

In FIG. 9, first, from a light source 11 using a semiconductor laser (LD), a linearly polarized light beam is emitted, and after being converted into a parallel light beam by a collimator lens 12, the linearly polarized light beam is incident on a polarized beam splitter (PBS) 13. Depending on the polarization direction of the incident light beam, the polarized beam splitter 13 reflects the incident beam or allows the incident beam to transmit. The polarized beam splitter 13 is provided to constitute an incident path of the linearly polarized light beam emitted from the light source 11 toward an optical disk, and a returning path of the light reflected from the optical disk toward a light detector.

After transmitting through the polarized beam splitter 13, the linearly polarized light beam emitted from the light source 11 is reflected by a launching mirror 14 in a direction to the optical disk, and transmits through a ¼ wavelength plate 15. At this moment, the linearly polarized light beam is given a phase difference equaling ¼ wavelength and becomes a circularly polarized light beam, transmits through an electro-optical element 16, and is condensed on the optical disk 18 by an object lens 17, thereby allowing recording data therein or reading data of pits therefrom.

The light reflected from the optical disk 18 becomes a circularly polarized light beam rotating in a direction opposite to that before the reflection. The circularly polarized light beam rotating in the opposite direction on the returning path transmits through the electro-optical element 16, and passes through the ¼ wavelength plate 15 again, where the linearly polarized light beam is given a phase difference equaling ¼ wavelength again, and becomes a linearly polarized light beam having a polarization direction different from that of the light beam on the incident path by 90°. As a result, the light beam on the returning path is incident into the polarized beam splitter 13 again, and is reflected by the polarized beam splitter 13, in contrast to transmission of the incident light beam on the incident path, is condensed by a detection lens 19, and is incident on a detector 20. The detector 20, for example, includes plural divisional light receiving elements, and outputs various servo signals, like focus servo or track servo, or a detection signal used for generating information reproduction signals.

In an information recording and reproduction device with sufficient efficiency being obtained in the incident path to secure adequate recording power, a R disk (dye) or a RW (phase change) disk can be recorded using the maximum power of the LD. The optical system used in such a situation may be structured by the polarized light optical system using the above polarized beam splitter 13, so that at the same time, sufficiently high efficiency is obtainable in the returning path during detection.

If the optical pickup having the configuration shown in FIG. 9 is adopted, when using the above-mentioned optical disks having high capacity, such as DVDs, or blue laser DVDs, a problem to be solved is variation of optimal recording conditions caused by the optical path difference of the optical disk. The optical path difference of the optical disk is due to the optical residual strain possessed by the transparent substrate fabricated by molding a poly-carbonate resin. Hence, before being reflected on the optical disk 18 and returned, the circularly polarized light beam passing through the ¼ wavelength plate 15 is affected by the phase difference of the optical disk 18, and becomes an elliptically polarized light beam. Afterwards, the light beam incident on the polarized beam splitter 13 is split into a polarized component, which is reflected and serves as a detected light beam, and a polarized component returning to the illumination optical system including the LD. Under this condition, generally, the LD noise increases because of the light returning to the LD, and the signals of the light reflected from the optical disk 18 are degraded because of variation of the LD emission power, which depends on a recording waveform.

Further, fluctuation of the optical path difference in the radial direction of the optical disk 18 arises when the temperature inside the device goes up or when the optical residual strain of the disk substrate varies; this fluctuation induces degradation of splitting capability of the polarized beam splitter 13 regarding the beam to the detector 20, and induces significant reduction of the detection signal. This fluctuation further causes it to be difficult to perform operations with high precision, such as focus servo or track servo, trial writing for deducing the optimal recording power to be used in recording, or recording power control during recording.

This problem occurs especially in an optical information recording and reproduction device for DVDs or the like, using a red laser. As disclosed in Japanese Laid Open Patent Application No. 2000-268398, to reduce the influence of the aforesaid optical path difference of the optical disk 18, as shown in FIG. 9, the electro-optical element 16, formed from a liquid crystal element, is arranged in the optical path of the optical pickup. After transmitting through the electro-optical element 16 formed from liquid crystal elements, the incident light beam is condensed on the optical disk 18 for recording and reproduction. When the reflected light passes though the electro-optical element 16 again, which is formed from liquid crystal elements, by controlling alignment of the liquid crystal molecules in the liquid crystal layer, a phase difference is given to the liquid crystal molecules such that the phase difference of the optical disk 18 is cancelled out. Due to this, the incident light beam is completely reflected on the polarized beam splitter 13, and the reflected light is directed to the detector 20, thereby preventing reduction of the detected light.

Further, an optical path difference detector 21 is provided, and a generator, such as an amplitude detection circuit, is used to generate a signal indicating the phase difference of the optical disk 18, while maintaining a constant angle between a polarization direction of a light beam, perpendicular to the optical axis of the light beam, and the alignment direction of the liquid crystal elements, the alignment direction of the liquid crystal elements being controlled such that the angle between the optical axis and the alignment direction of the liquid crystal elements in a plane including the optical axis changes to induce cancellation of the phase difference of the optical disk 18 in the light beam passing through the liquid crystal elements.

Although the phase difference of the optical disk 18 can be cancelled out by using the electro-optical element 16, the structure of the optical pickup becomes complicated, and the transmittance of the light beam in the incident path and transmittance in the returning path decline. Further, the cost of the device increases.

Further, the aforesaid elliptically polarized light beam component generated due to the optical path difference of the optical disk cannot be split by the polarized beam splitter 13 or a polarized beam hologram, and this reduces the detected light beam.

Concerning such an optical path difference of the optical disk, the elliptically polarized light beam component of the light beam from the LD light source can be separated into a P-polarized light component and an S-polarized light component by a separate polarized beam splitter, and light amounts of the components can be measured by separate light receiving elements. Further, without using the light beam from the LD light source, it is also possible to detect the amounts of light corresponding to the optical path difference of the optical disk by arranging separate LD light sources and light receiving elements besides optical systems for recording or reproducing the optical disk.

However, arrangement of electro-optical elements for correcting the optical path difference of the optical disk suffers from limitations in optical layout of the optical pickup device, a rise of cost due to an increased number of parts, the shape of the optical pickup, or an increased number of signal lines, and other problems.

DISCLOSURE OF THE INVENTION

An object of the present invention is to provide a simplified method of recording optical information that allows omission of an electro-optical element or other correction units and enables solution of problems in recording operations caused by decline of light amount due to an optical path difference of an optical recording medium.

More specifically, an object of a first aspect of the present invention (the invention related to claim 1) is to provide a simplified and precise optical information recording method that corrects control errors of a setting value of recording power and the recording power caused by decline of the light amount due to an optical path difference of an optical recording medium.

Objects of a second aspect and a third aspect of the present inventions (inventions related to claim 2 and claim 3) are to provide simplified and precise optical information recording methods that correct calculation errors of recording power due to variation of detection of a reproduction signal at a trail write region caused by decline of the light amount due to an optical path difference of an optical recording medium.

Objects of a fourth aspect and a fifth aspect of the present inventions (inventions related to claim 4 and claim 5) are to provide simplified and precise optical information recording methods that correct calculation errors of recording power at a trail write region due to variation of detection of the amount of reflected light during recording caused by decline of the light amount due to an optical path difference of an optical recording medium.

An object of a sixth aspect of the present invention (the invention related to claim 6) is to provide a simplified and precise optical information recording method that separates variations due to mechanical characteristics included in variation of the amount of light reflected from an optical recording medium, such as a fluctuation of reflectivity, tilt, eccentricity, or a plane vibration, and enables acquisition of an initial value of the optical path difference of the optical recording medium.

Objects of a seventh aspect and a ninth aspect of the present inventions (inventions related to claim 7 and claim 9) are to provide simplified and precise optical information recording methods that correct errors of optimum recording power at a trail write region, or correct deviation of the optimum recording power during recording, caused by variation of the optical path difference of an optical recording medium along with temperature variation in an optical information recording and reproduction device.

An object of an eighth aspect of the present invention (the invention related to claim 8) is to provide a precise optical information recording method that allows direct detection of the optical path difference of the optical recording medium by using a detection unit to separate a variation of detected light amount due to mechanical characteristics of the optical recording medium.

An object of a 10th aspect of the present invention (the invention related to claim 10) is to provide an optical disk used as an optical recording medium in an optical information recording and reproduction device, which is able to separate variations due to mechanical characteristics included in variation of the amount of light reflected from an optical recording medium, such as, a fluctuation of reflectivity, tilt, eccentricity, or a plane vibration, able to acquire an initial value of the optical path difference of the optical recording medium, and able to correct optimum recording power with high precision.

Objects of an 11th aspect and a 12th aspect of the present inventions (inventions related to claim 11 and claim 12) are to provide optical information recording and reproduction devices (optical disk drive device) using the above optical information recording method and the optical disk.

To attain the above objects, according to the first aspect of the present invention, there is provided an optical information recording method of an optical information recording and reproduction device that uses a semiconductor laser to record or reproduce data in an optical recording medium, said optical information recording method comprising a step of adjusting a calculated value of optimum recording power for recording data or an object value of recording power when data are being recorded, based on a detected value of an optical path difference of the optical recording medium.

According to the second aspect of the present invention, in the optical information recording method related to the first aspect of the present invention, when calculating the optimum recording power before recording data in the optical recording medium, an optimum index indicating the optimum recording power is corrected with respect to a predetermined first index based on the detected value of the optical path difference of the optical recording medium, and the corrected optimum index is used as the calculated value of the optimum recording power, said predetermined first index being obtained by reproducing a trial write region that is recorded with recording power being varied stepwise.

According to the third aspect of the present invention, in the optical information recording method related to the second aspect of the present invention, a value of the predetermined first index is an asymmetric value equaling a ratio of a difference between a maximum and a minimum of a direct current component of a reproduction signal from the trial write region to a sum of the maximum and the minimum.

According to the fourth aspect of the present invention, in the optical information recording method related to the first aspect of the present invention, an object index indicating the optimum recording power is corrected and updated continually based on the detected value of the optical path difference of the optical recording medium with respect to a predetermined second index, and the corrected object index is used to correct the optimum recording power while recording, said predetermined second index being obtained from a detection signal associated with an amount of light reflected from the optical recording medium when data are being recorded in the optical recording medium.

According to the fifth aspect of the present invention, in the optical information recording method related to the fourth aspect of the present invention, a value of the third index is an average value of the detected signal associated with the amount of reflected light or a sample value of the amount of reflected light when forming a recording mark normalized by the recording power.

According to the sixth aspect of the present invention, in the optical information recording method related to one of the first aspect through the fifth aspect of the present invention, an initial value of the optical path difference of the optical recording medium is obtained by reading out information of the optical path difference of the optical recording medium or information of a distribution of the optical path difference of the optical recording medium from pre-format information to calculate a detected value of the optical path difference before the data are recorded or when the data are being recorded.

According to the seventh aspect of the present invention, in the optical information recording method related to one of the first aspect through the sixth aspect of the present invention, a change of the optical path difference is calculated from the amount of light reflected from the optical recording medium; and the first index or the third index is corrected by a conversion unit according to the change.

According to the eighth aspect of the present invention, in the optical information recording method related to one of the first aspect through the sixth aspect of the present invention, the first index or the third index is corrected by using a detected value of a detection unit for detecting an elliptically polarized light beam component of the light reflected from the optical recording medium.

According to the ninth aspect of the present invention, in the optical information recording method related to one of the first aspect through the sixth aspect of the present invention, the first index or the third index is corrected by using a detected value of a temperature or a change of the temperature near the optical recording medium based on desired temperature dependence.

According to the tenth aspect of the present invention, there is provided an optical disk used as an optical recording medium in an optical information recording and reproduction device, said optical disk being recorded with information by using the information recording method as claimed in any one of claims 1 through 9, wherein information indicating an optical path difference of a trial write region assigned to the optical disk or distribution information of the optical path difference of the optical disk in a radial direction is formed in advance as recording condition information or recording management information included in pre-format information of the optical disk.

According to the 11th aspect of the present invention, there is provided an optical information recording and reproduction device that uses a semiconductor laser to record or reproduce data in an optical recording medium by using the information recording method as claimed in any one of claims 1 through 9.

According to the 12th aspect of the present invention, in the optical information recording method related to the 11th aspect of the present invention, the optical disk as claimed in claim 10 is used as the optical recording medium.

BRIEF DESCRIPTION OF THE DRAWINGS

These and other objects, features, and advantages of the present invention will become more apparent from the following detailed description of preferred embodiments given with reference to the accompanying drawings.

FIG. 2A through FIG. 2E explain the recording method of the present invention;

FIGS. 8A through 8C show relations between a LD recording waveform, a mark shape, and a detection signal waveform, and FIG. 8D shows relations between a recording power (heating power), sampling values, and a R-OPC index;

Reference numbers used in the above drawings are explained below. 1 indicates a semiconductor laser (LD) light source, 2 indicates a collimator lens, 3 indicates a polarized beam splitter (PBS), 4 indicates a launching mirror, 5 indicates a ¼ wavelength plate, 6 indicates an object lens, 7 indicates an optical disk, 8 indicates a detection lens, and 9 indicates a detector.

BEST MODE FOR CARRYING OUT THE INVENTION

Below, structures, operations and functions of the optical information recording method, the optical disk, and the optical information recording device (optical disk drive) of the present invention are described in detail with reference to the accompanying drawings.

FIRST EMBODIMENT

First, an embodiment related to the first aspect through the fifth aspect, the seventh aspect, and the 11th aspect of the present invention is described.

Figure 1:
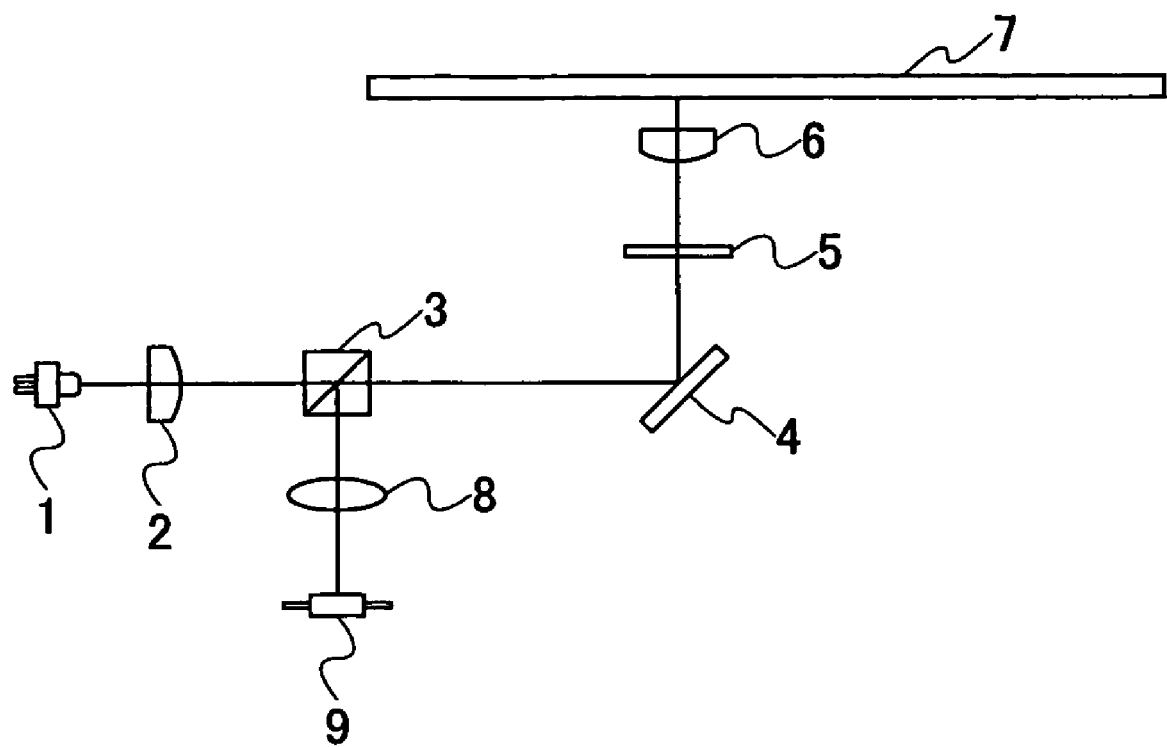
FIG. 1 is a view illustrating a configuration of an optical pickup of an optical information recording and reproduction device according to a first embodiment of the present invention.

FIG. 1 is a diagram illustrating an example of a configuration of a portion of an optical pickup of an optical information recording and reproduction device according to a first embodiment of the present invention.

In FIG. 1, a laser beam emitted from a light source 1 formed by a semiconductor laser (LD) is a linearly polarized light beam, and is converted into a parallel light beam by a collimator lens 2. The linearly polarized light beam is incident on a polarized beam splitter (PBS) 3, and transmits through the polarized beam splitter 3 as a light beam having a constant polarization direction. The linearly polarized light beam is reflected by a launching mirror 4 toward an optical disk, and transmits through a ¼ wavelength plate (λ/4 plate) 5, whereby the linearly polarized light beam becomes a circularly polarized light beam, is incident on an object lens 6, and condensed on the optical disk 7 to be a tiny light spot.

The light reflected on the optical disk 7 becomes a circularly polarized light beam rotating in a direction opposite to that of the incident light beam, and passes through the ¼ wavelength plate 15 again, whereby it becomes a linearly polarized light beam having a polarization direction perpendicular to that of the incident light beam. As a result, the light beam is reflected by the polarized beam splitter (PBS) 3, condensed again by a detection lens 8, and is incident on a detector 20, which includes plural divisional light receiving elements. Thereby, various servo signals, like focus servo or track servo, or an information reproduction signal can be obtained.

In the optical information recording and reproduction device (optical disk drive device) including the optical pickup having such a configuration, the detected light amount declines because of the optical path difference of the optical disk 7, and thus, the information reproduction signal varies.

Figure 3:
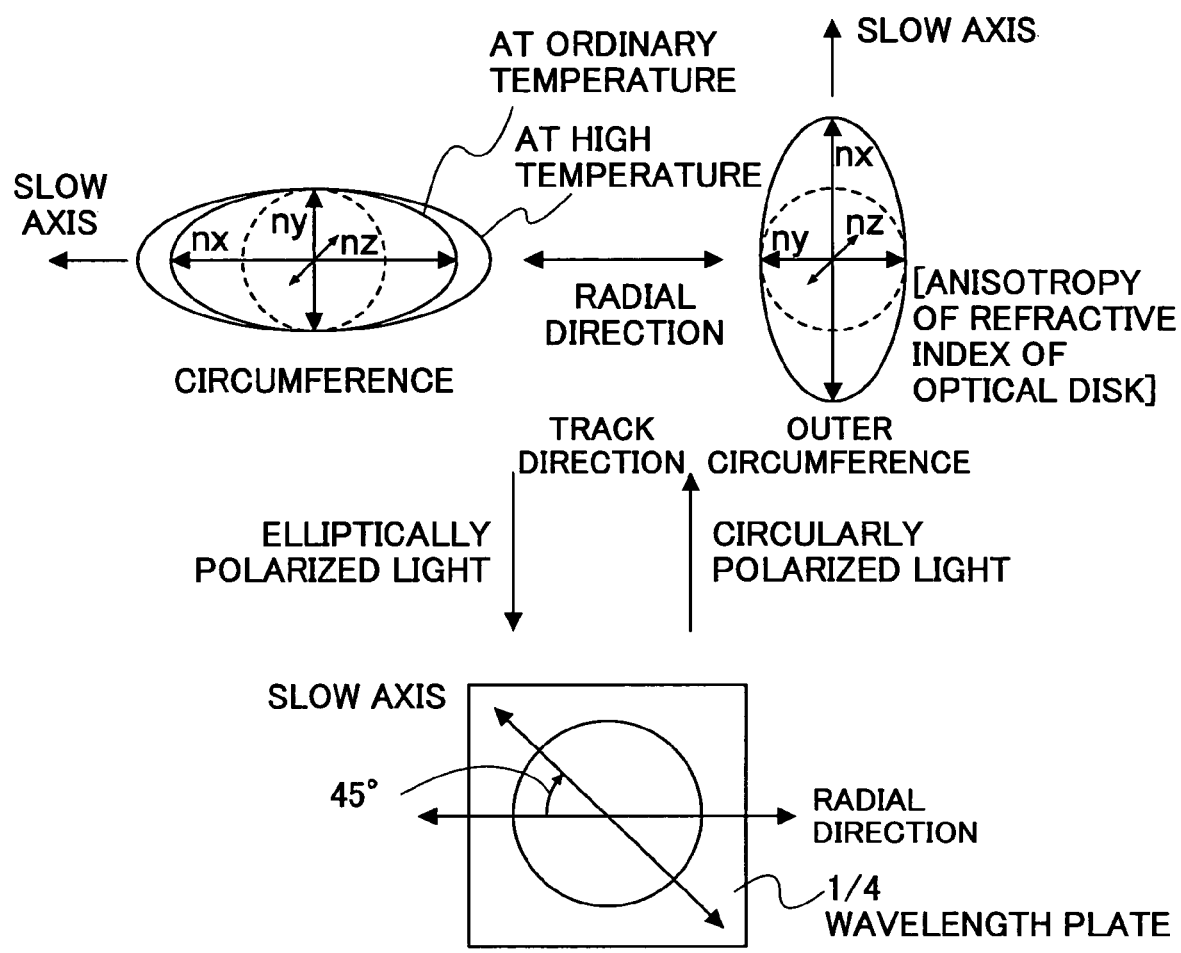
FIG. 3 is a diagram illustrating the optical path difference of the optical disk 7.

FIG. 3 is a diagram illustrating the optical path difference of the optical disk 7.

Specifically, as illustrated in FIG. 3, the optical path difference of the optical disk 7 arises when optical strain, which occurs in injection molding of a disk substrate, remains in a track direction or a radial direction. Generally, in the inner circumference part of the optical disk, a slow axis of the polycarbonate material of the disk substrate, namely, the direction of the maximum refractive index, is along the radial direction, and changes to be along the radial direction in the outer circumference part. At this moment, the variation along the radial position involves a change of the refractive index only, but the slow axis does not rotate at all.

Figure 4:
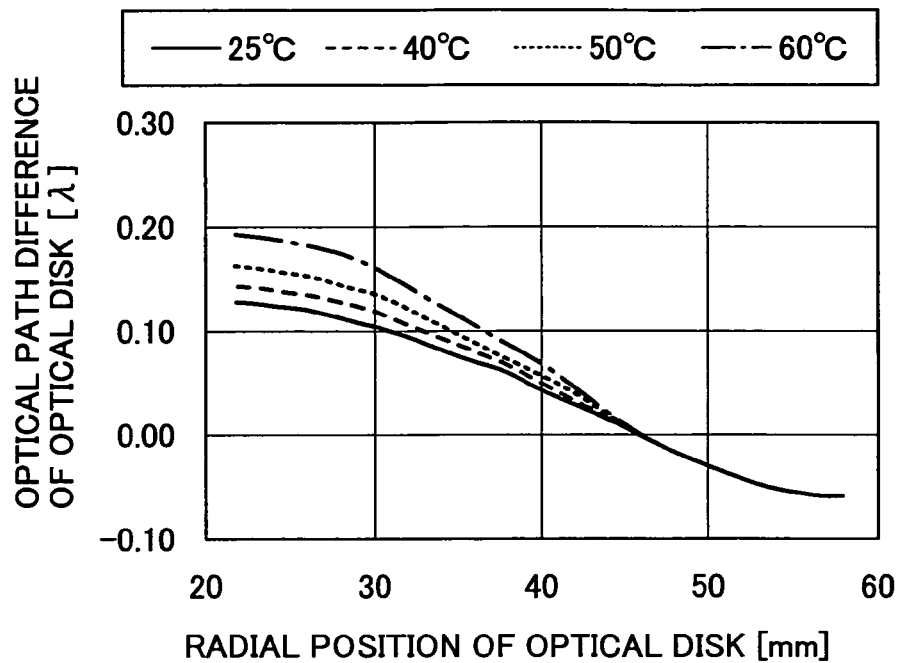
FIG. 4 shows a relation between the optical path difference and a radial position on the optical disk.

FIG. 4 shows a relation between the optical path difference and a radial position on the optical disk.

Figure 5:
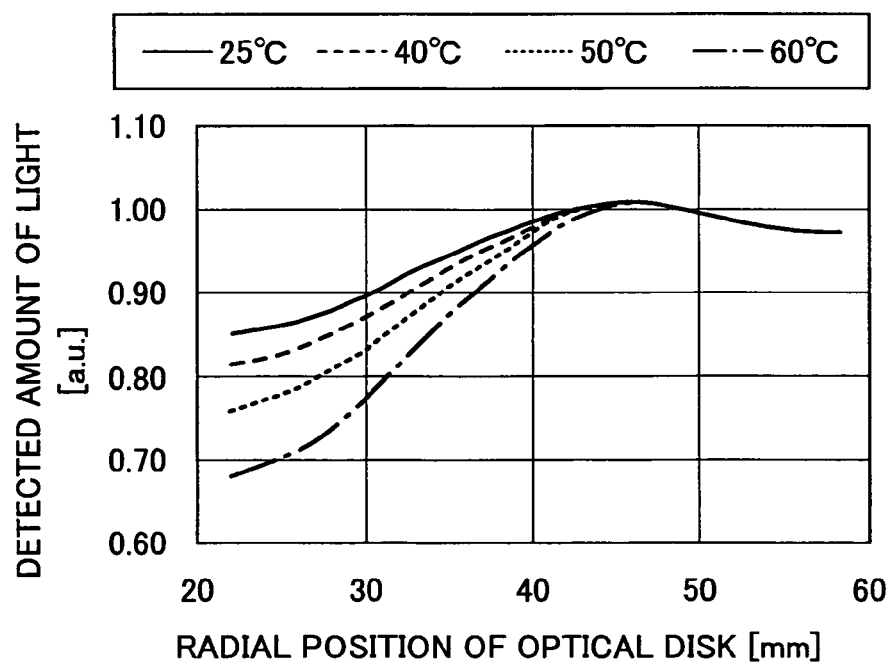
FIG. 5 shows a relation between the detected amount of light and the radial positions.

FIG. 5 shows a relation between the detected amount of light and the corresponding radial positions.

Further, when an inner temperature of the optical disk drive becomes high the optical strain increases in the inner circumference part of the optical disk, and as shown above, the optical path difference and the detected amount of light fluctuate.

FIG. 4 shows the behavior of decline of the amount of the light in the optical pickup due to an increase of the optical path difference along with an increase of the temperature. Specifically, in the innermost circumference part, the decline is most noticeable; from the middle circumference part to the outer circumference part, because the optical strain does not occur, there is essentially no decline.

Figure 6:
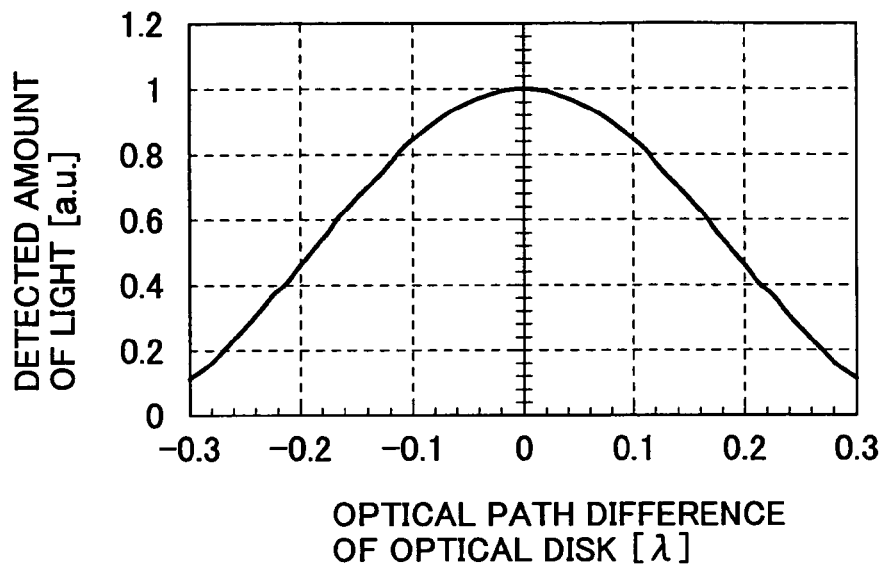
FIG. 6 shows a relation between the optical path difference s and the detected light amount I.

FIG. 6 shows a relation between the optical path difference s and the detected light amount I.

The relation between the optical path difference s and the detected light amount I can be expressed approximately by the following equation.

$$I = (1 + \cos(k*p*s))/2$$

Re-arrange the equation, and one has $$s = 1/k/p*a \cos(2*I - 1)$$

The optical path difference s can be deduced from this equation.

Next, immediately before the start of usual recording operations, as a preliminary step of initializing the recording operations, trial writing (OPC) is performed.

FIG. 2A through FIG. 2E explain the recording method of the present invention.

As shown in FIG. 2A, near the innermost circumference part of the optical disk medium, a PCA (Power Calibration Area) is formed, and the OPC can be performed many times.

As shown in FIG. 2B, for example, within one ECC, which is the unit of recording data and includes 16 sectors, the trial writing is performed using in total 8 steps of the recording power with one step of the recording power being assigned to one sector.

As shown in FIG. 2C, from reproduction signals of the recorded trial write areas associated with different heating power levels, a maximum Ipk, a minimum Ibtm, and an average Idc, as shown in FIG. 2D, an asymmetry parameter β, indicting asymmetry of the maximum amplitude Imax and the average Idc, is calculated from the following equation and is retained.

$$\beta = [(Ipk - Idc) - (Idc - Ibtm)]/(Ipk - Ibtm)$$

Further, from pre-format information of the optical disk, an optimum value of β included in recording condition information is read out (in the present embodiment, it is 0), and optimum recording power (namely, optimum heating power) Pwo (optimum) is calculated from an approximation formula obtained from these data points.

Next, as for a target index value used in R-OPC operations, as shown in FIG. 2E, from reproduction signals of the recorded trial write areas associated with different heating power levels, the amount of light within the duration of a recording pulse, which is used for forming recoding marks, is regarded as a sampling value Ismp and is retained.

FIGS. 8A through 8C show relations between a LD recording waveform, a mark shape, and a detection signal waveform.

FIG. 8D shows relations between recording power (heating power), sampling values, and a R-OPC index.

As shown in FIG. 8D, the value of Ismp/Pw normalized by respective recording power Pw is used as the R-OPC index. When the recording power is partially too high, as illustrated in the LD recording waveform shown in FIG. 8A, the detected light amount (detection signal) declines, as shown in FIG. 8C, and the R-OPC index also declines, as shown in FIG. 8D. For this reason, the recording power is reduced so as to be consistent with the value of the target index Ismp/Pw. Due to the R-OPC operations as shown in FIG. 8D, the recording mark is controlled to have a specified shape, and this ensures uniform recording conditions.

With the above configurations, when performing high precision recording with the R-OPC operations, because the detected light amount changes when the optical path difference of the optical disk changes due to temperature rising or radial position distribution, the precision of the R-OPC operations declines. For example, when the optical path difference of the optical disk increases due to a rise of the temperature, the detected light amount declines, the same as the case when the recording power is too high; thus, it cannot be distinguished from the state related to a recording power change.

In the present embodiment, the aforesaid target index Ismp/Pw is corrected in correspondence to the change of Ismp caused by the optical path difference; thereby, the precision of the R-OPC operations can be improved. Specifically, the amount of the reflected light is detected in advance along a radial direction of the optical disk, or a rise of the temperature is detected and the change of the optical path difference is calculated. Then, the change of the detected light amount caused by the change of the optical path difference is calculated, and Ismp is corrected by using the thus obtained change of the detected light amount. In this way, it is possible to obtain recording conditions with influence of the optical path difference being eliminated, and the target value of recording power can be adjusted with high precision.

In addition, as for the target index Ismp/Pw of the R-OPC operation, instead of the sampling value Ismp of the detected amount of light during recording, an average value of the detection signals passing through a low-pass filter (LPF) can be obtained and used as Ismp, with the low-pass filter being set to have a cutoff frequency sufficiently lower than the band of modulated signals of recording pulses appearing in the detected signals.

SECOND EMBODIMENT

Below, an embodiment related to the 10th aspect and the 12th aspect of the present invention is described.

The optical path difference of the optical disk 7 described in the first embodiment also induces errors of the parameter $\beta$, which is an index used when calculating the optimum recording power.

Figure 7:
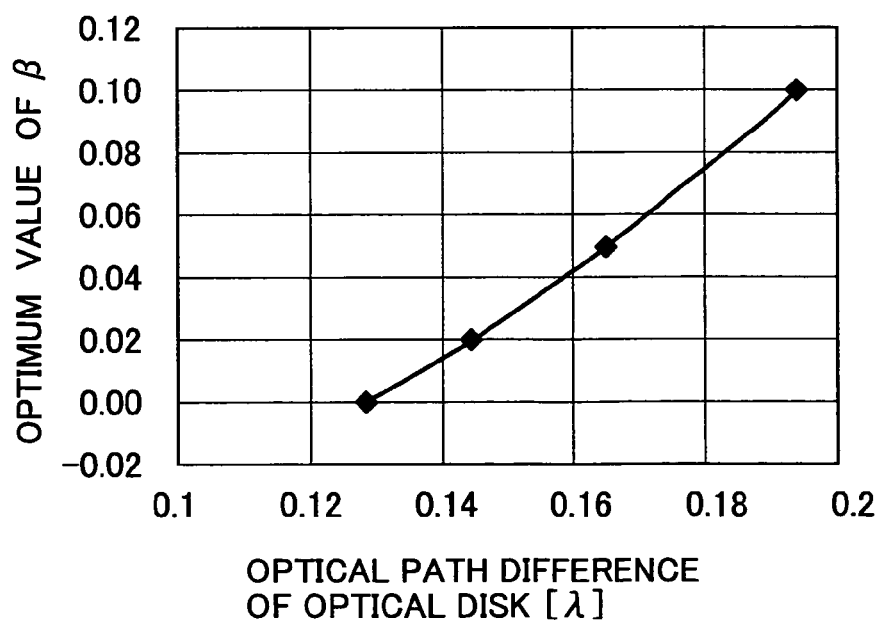
FIG. 7 shows a relation between the optical path difference and the optimum value of β.

FIG. 7 shows a relation between the optical path difference and the optimum value of $\beta$.

As illustrated in FIG. 7, $\beta$ increases along with the optical path difference. The error of $\beta$ occurs when the elliptically polarized light beam caused by the aforesaid optical path difference is split by the polarized beam splitter (PBS) 3, and passes through as a returning light beam to the side of the LD light source 1, whereby the output power of the LD light source 1 changes depending on presence or absence of the recording marks or pits, and the modulation degree of the reproduction signals declines. The present embodiment discloses a procedure to correct this error of $\beta$.

As recording condition information recorded in an optical disk, generally, the type of the optical disk, the width of the recording pulse, the optimum recording power, the optimum value of $\beta$, and others are recorded by modulating wobbling signals, related to track groove wobbling, by frequency modulation or phase modulation.

In a DRAW (Direct Read After Write) type optical disk of the present embodiment, the information of the optical path difference of the optical disk is recorded as recording condition information in order to correct the optimum value of $\beta$ having errors caused by the optical path difference of the optical disk.

In the present embodiment, those recorded beforehand as the information of the optical path difference recorded in the DRAW type optical disk can be the optical path difference at the radial position corresponding to the inner circumference (PCA area) at room temperature, or the optical path difference at plural radial positions corresponding to the inner circumference, the middle circumference, and the outer circumference, or coefficients of an approximation formula of the optical path difference at different radial positions (in a quadratic expression, they are a, b, c). Further, information useful to correction of an index can also be recorded, such as the characteristic value indicating temperature dependence of the optical path difference.

Figures 9, 10:
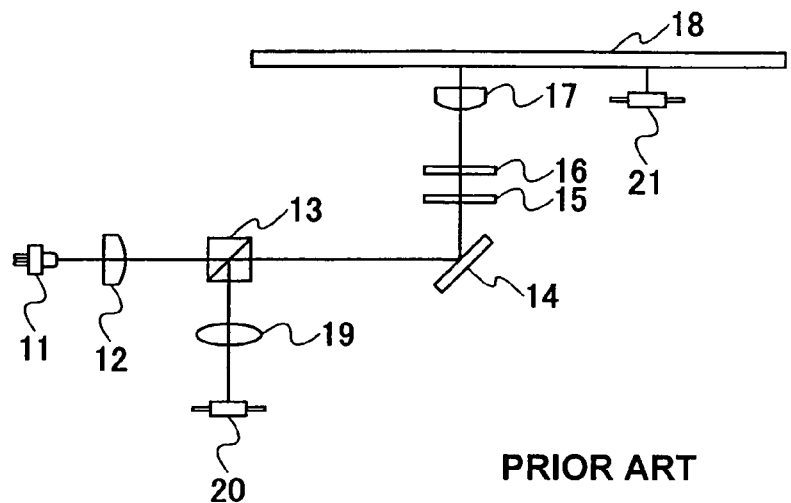
FIG. 9 is a diagram illustrating an example of a configuration of an optical pickup of an optical information recording and reproduction device.
FIG. 10 is a table showing information recorded in the DRAW type optical disk.

FIG. 10 is a table showing information recorded in the DRAW type optical disk.

The optical information recording and reproduction device of the present embodiment reads these pieces of information recorded in the DRAW type optical disk, and executes the recording method described in the first embodiment or in the next embodiments.

THIRD EMBODIMENT

Next, an embodiment related to the sixth aspect and the 11th aspect of the present invention is described.

In the optical information recording and reproduction device of an optical disk, before and after the optical disk is set in the device, the optical path difference changes due to a change of the temperature near the optical disk. Even in the trial write region (OPC) before recording, the parameter $\beta$ indicting the optimum recording power in the PCA area changes due to the change of the optical path difference, as shown in FIG. 7.

In the present embodiment, the optimum value of $\beta$ and the optical path difference at the inner circumference part are read from the pre-format information of the optical disk, and are used as initial values. Next, corresponding to a rise of the temperature of the optical disk at the time when starting actual recording, the optical path difference is calculated from the decline of the detected amount of light. Further, from the following approximation formula of the optical path difference s and the optimum value of $\beta$, the optimum value of $\beta$ read out from the optical disk is corrected; thereby, the optimum recording power can be calculated accurately.

$\beta = a*s^2 + b*s + c$.

In FIG. 7, a=5.2, b=−0.17, c=−0.066.

Next, the sampling value Ismp of the detected amount of light when forming recoding marks, which is the target index indicating the optimum recording power for R-OPC, is calculated from the reduction of the detected amount of light relative to the initial value based on a detected value of the optical path difference, and the target index Ismp/Pwo is corrected. This correction can be obtained immediately before recording the change of the optical path difference at corresponding radial positions, and with an approximation formula related to the radial positions, it is possible to correct the target index at any time when necessary. Because of this correction, it is possible to correct the shift of the optimum recording power associated with the change of the optical path difference, and maintain optimum recording conditions.

FOURTH EMBODIMENT

Below, an embodiment related to the eighth aspect, the ninth aspect, and the 11th aspect of the present invention is described.

As a method of detecting the optical path difference of an optical disk, a phase difference sensor (not illustrated) may be used for separating and detecting a P-polarized light component and an S-polarized light component as the elliptically polarized light beam component of the light beam reflected from the optical disk, and it is possible to obtain a detection value the same as the reduction of the detected amount of light, and to calculate the detection value of the optical path difference of an optical disk. The change of the optical path difference is calculated from this calculated result, and it is possible to correct the optimum value of β, obtained by the above approximation formula.

In addition, as shown in FIG. 4 and FIG. 5, concerning the change of the optical path difference due to the change of the temperature near the optical disk, a temperature sensor can be set in the optical pickup near the optical disk to detect the temperature near the optical disk, and thereby, the change of the temperature can be detected. The change of the optical path difference can be calculated based on the change of the temperature, and it is possible to correct the optimum value of β, obtained by the above approximation formula.

As described in the above embodiments, correction is made to the change of the optical path difference in the process of deciding recording conditions on the optical disk, and the optical disk is recorded while the recording power is being constantly corrected in correspondence to the change of the optical path difference during recording, and this enables uniform and precise recording over all of the disk. Specifically, with the information recording method and the optical disk having the above configurations, it is possible to correct, with the detected optical path difference, errors of the optimum recording power caused by the change of the optical path difference of the optical disk, and this enables separation of the errors from the variation of the recording power itself. Hence, it is possible to improve calculation precision of the optimum recording power in trial writing (OPC), and to separate the change of the optical path difference in the R-OPC operations, which corrects the recording power during recording, and to correct the setting of the target value of the recording power with high precision. In addition, it is possible to correct the change of the optical path difference related to a temperature rise of the optical disk, and to further reduce the error of the optimum recording power to the optical disk.

As described above, in the invention related to the first aspect of the present invention, it is possible to provide a simplified and precise optical information recording method that is able to correct control errors of a setting value of recording power and the recording power caused by decline of light amount due to an optical path difference of an optical recording medium (optical disk).

In the invention related to the second aspect and the third aspect, it is possible to provide a simplified and precise optical information recording method that is able to correct calculation errors of recording power due to variation of detection of a reproduction signal in a trail write region caused by decline of light amount due to an optical path difference of an optical recording medium (optical disk).

In the invention related to the fourth aspect and the fifth aspect, it is possible to provide a simplified and precise optical information recording method that is able to correct calculation errors of recording power at a trail write region due to variation of detection of amount of reflected light during recording caused by decline of light amount due to an optical path difference of an optical recording medium (optical disk).

In the invention related to the sixth aspect of the present invention, it is possible to provide a simplified and precise optical information recording method that is able to separate variations due to mechanical characteristics included in variation of an amount of light reflected from an optical recording medium, such as, fluctuation of reflectivity, tilt, eccentricity, or a plane vibration, and enables acquisition of an initial value of the optical path difference of the optical recording medium (optical disk).

In the invention related to the seventh aspect and the ninth aspect, it is possible to provide a simplified and precise optical information recording method that is able to correct errors of optimum recording power in a trail write region, or correct deviation of the optimum recording power during recording, caused by a variation of an optical path difference of an optical recording medium (optical disk) along with a temperature variation in an optical information recording and reproduction device.

In the invention related to the eighth aspect of the present invention, it is possible to provide a precise optical information recording method that allows direct detection of the optical path difference of the optical recording medium by using a detection unit to separate a variation of detected light amount due to mechanical characteristics of the optical recording medium (optical disk).

In the invention related to the 10th aspect of the present invention, it is possible to provide a DRAW type optical disk used as an optical recording medium in an optical information recording and reproduction device, which is able to separate variations due to mechanical characteristics included in variation of an amount of light reflected from an optical disk, such as fluctuation of reflectivity, tilt, eccentricity, or a plane vibration, able to acquire an initial value of the optical path difference of the optical recording medium, and able to correct optimum recording power with high precision.

In the invention related to the 11th aspect and the 12th aspect, it is possible to provide an optical information recording and reproduction device (optical disk drive device) using the above optical information recording method and the optical disk.

While the present invention is above described with reference to specific embodiments chosen for purpose of illustration, it should be apparent that the invention is not limited to these embodiments, but numerous modifications could be made thereto by those skilled in the art without departing from the basic concept and scope of the invention.

The invention claimed is:

1. An optical information recording method of an optical information recording and reproduction device that uses a semiconductor laser to record or reproduce data in an optical recording medium, said optical information recording method comprising a step of:

adjusting a calculated value of optimum recording power for recording data or an object value of recording power when data are being recorded, based on a detected value of an optical path difference of the optical recording medium; and wherein when calculating the optimum recording power before recording data in the optical recording medium, an optimum index indicating the optimum recording power is corrected with respect to a predetermined first index based on the detected value of the optical path difference of the optical recording medium, and the corrected optimum index is used as the calculated value of the optimum recording power, said predetermined first index being obtained by reproducing a trial write region that is recorded with recording power being varied stepwise.

2. The optical information recording method as claimed in claim 1, wherein a value of the predetermined first index is an asymmetric value equaling a ratio of a difference between a maximum and a minimum of a direct current component of a reproduction signal from the trial write region to a sum of the maximum and the minimum.

3. The optical information recording method as claimed in claim 1, wherein a change of the optical path difference is calculated from the amount of light reflected from the optical recording medium; and the first index or a second index is corrected by a conversion unit according to the change.

4. The optical information recording method as claimed in claim 1, wherein the first index or a second index is corrected by using a detected value of a detection unit for detecting an elliptically polarized light beam component of the light reflected from the optical recording medium.

5. The optical information recording method as claimed in claim 1, wherein the first index or a second index is corrected by using a detected value of a temperature or a change of the temperature near the optical recording medium based on desired temperature dependence.

6. An optical information recording method of an optical information recording and reproduction device that uses a semiconductor laser to record or reproduce data in an optical recording medium, said optical information recording method comprising a step of:

adjusting a calculated value of optimum recording power for recording data or an object value of recording power when data are being recorded, based on a detected value of an optical path difference of the optical recording medium; and wherein an object index indicating the optimum recording power is corrected and updated continually based on the detected value of the optical path difference of the optical recording medium with respect to a predetermined second index, and the corrected object index is used to correct the optimum recording power while recording, said predetermined second index being obtained from a detection signal associated with an amount of light reflected from the optical recording medium when data are being recorded in the optical recording medium.

7. The optical information recording method as claimed in claim 6, wherein a value of the second index is an average value of the detected signal associated with the amount of reflected light or a sample value of the amount of reflected light when forming a recording mark normalized by the recording power.

8. The optical information recording method as claimed in claim 7, wherein a change of the optical path difference is calculated from the amount of light reflected from the optical recording medium; and the first index or the second index is corrected by a conversion unit according to the change.

9. The optical information recording method as claimed in claim 7, wherein the first index or the second index is corrected by using a detected value of a detection unit for detecting an elliptically polarized light beam component of the light reflected from the optical recording medium.

10. The optical information recording method as claimed in claim 7, wherein the first index or the second index is corrected by using a detected value of a temperature or a change of the temperature near the optical recording medium based on desired temperature dependence.

11. An optical information recording method of an optical information recording and reproduction device that uses a semiconductor laser to record or reproduce data in an optical recording medium, said optical information recording method comprising a step of:

adjusting a calculated value of optimum recording power for recording data or an object value of recording power when data are being recorded, based on a detected value of an optical path difference of the optical recording medium; and wherein an initial value of the optical path difference of the optical recording medium is obtained by reading out information of the optical path difference of the optical recording medium or information of a distribution of the optical path difference of the optical recording medium from pre-format information to calculate a detected value of the optical path difference before the data are recorded or when the data are being recorded.

12. An optical disk used as an optical recording medium in an optical information recording and reproduction device, said optical disk being recorded by said optical information recording and reproduction device, and wherein said device uses a semiconductor laser to record or reproduce data, and wherein the device adjusts a calculated value of optimum recording power for recording data or an object value of recording power when data are being recorded, based on a detected value of an optical path difference of the optical recording medium; and wherein the device obtains an initial value of the optical path difference of the optical recording medium by reading out information of the optical path difference of the optical recording medium or information of a distribution of the optical path difference of the optical recording medium from pre-format information to calculate a detected value of the optical path difference before the data are recorded or when the data are being recorded; and wherein information indicating an optical path difference of a trial write region assigned to the optical disk or distribution information of the optical path difference of the optical disk in a radial direction is formed in advance as recording condition information or recording management information among pre-format information of the optical disk.

* * * * *